(12) United States Patent
Koch

(10) Patent No.: US 8,572,230 B2
(45) Date of Patent: *Oct. 29, 2013

(54) SYSTEM FOR USING ATTRIBUTES TO DEPLOY DEMAND RESPONSE RESOURCES

(75) Inventor: Edward Koch, San Rafael, CA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/153,251

(22) Filed: Jun. 3, 2011

(65) Prior Publication Data

US 2011/0301774 A1    Dec. 8, 2011

Related U.S. Application Data

(63) Continuation-in-part of application No. 13/019,943, filed on Feb. 2, 2011, and a continuation-in-part of application No. 12/834,841, filed on Jul. 12, 2010.

(60) Provisional application No. 61/301,123, filed on Feb. 3, 2010, provisional application No. 61/271,084, filed on Jul. 17, 2009.

(51) Int. Cl.
*G06F 1/26* (2006.01)

(52) U.S. Cl.
USPC .............................. 709/223; 709/219; 370/218

(58) Field of Classification Search
USPC .......................... 709/219, 223, 233; 370/218
See application file for complete search history.

(56) References Cited

U.S. PATENT DOCUMENTS

| | | |
|---|---|---|
| 4,110,827 A | 8/1978 | Shavit |
| 4,130,874 A | 12/1978 | Pai |
| 4,419,667 A | 12/1983 | Gurr et al. |
| 4,937,760 A | 6/1990 | Beitel et al. |
| 5,341,142 A | 8/1994 | Reis et al. |

(Continued)

FOREIGN PATENT DOCUMENTS

| | | |
|---|---|---|
| WO | WO 2009/006133 | 1/2009 |
| WO | WO 2009/020606 | 2/2009 |

(Continued)

OTHER PUBLICATIONS

U.S. Appl. No. 12/895,640, filed Sep. 30, 2010.

(Continued)

*Primary Examiner* — Wing F Chan
*Assistant Examiner* — Tesfay Yohannes
(74) *Attorney, Agent, or Firm* — Seager Tufte & Wickhem LLC.

(57) ABSTRACT

A system for using attributes to deploy demand response resources. A service provider may provide energy to customers. The provider may via interactions modify consumption of the energy by the customers. Customers that participate in these interactions may be regarded as demand response resources. Interactions may incorporate demand response signals sent to the resources at their respective facilities. Each resource may have a demand response client which has an association with a customer account in a demand response management system of the provider. The association may be regarded as a binding of the demand response client. The binding may involve inputting an attribute of the demand response client, which can be correlated to the customer account. The attribute may be, for example, a location of the demand response client. Such attribute may be used for the association of the demand response client with a proper customer account.

10 Claims, 2 Drawing Sheets

(56) References Cited

U.S. PATENT DOCUMENTS

| | | | |
|---|---|---|---|
| 5,566,084 A | 10/1996 | Cmar | |
| 5,572,438 A | 11/1996 | Ehlers et al. | |
| 5,598,349 A | 1/1997 | Elliason et al. | |
| 6,026,375 A * | 2/2000 | Hall et al. | 705/26.43 |
| 6,209,018 B1 | 3/2001 | Ben-shacher et al. | |
| 6,259,723 B1 | 7/2001 | Miyashita | |
| 6,289,384 B1 | 9/2001 | Whipple et al. | |
| 6,366,926 B1 | 4/2002 | Pohlmann et al. | |
| 6,446,136 B1 | 9/2002 | Pohlmann et al. | |
| 6,519,509 B1 | 2/2003 | Nierlich et al. | |
| 6,529,723 B1 | 3/2003 | Bentley | |
| 6,566,926 B1 | 5/2003 | Patterson | |
| 6,574,581 B1 | 6/2003 | Bohrer et al. | |
| 6,865,685 B2 | 3/2005 | Hammond et al. | |
| 7,010,700 B1 | 3/2006 | Foss et al. | |
| 7,039,532 B2 | 5/2006 | Hunter | |
| 7,069,309 B1 | 6/2006 | Dodrill et al. | |
| 7,260,616 B1 | 8/2007 | Cook | |
| 7,333,880 B2 | 2/2008 | Brewster et al. | |
| 7,337,237 B2 | 2/2008 | Salahshoor et al. | |
| 7,346,467 B2 | 3/2008 | Bohrer et al. | |
| 7,392,115 B2 | 6/2008 | Schindler | |
| 7,401,086 B2 | 7/2008 | Chorafakis et al. | |
| 7,528,503 B2 | 5/2009 | Rognli et al. | |
| 7,565,227 B2 | 7/2009 | Richard et al. | |
| 7,650,289 B2 | 1/2010 | Cooper et al. | |
| 7,676,657 B2 | 3/2010 | Lindholm et al. | |
| 7,702,424 B2 | 4/2010 | Cannon et al. | |
| 7,742,953 B2 | 6/2010 | King et al. | |
| 7,797,009 B2 | 9/2010 | Kiiskila et al. | |
| 7,845,576 B2 | 12/2010 | Siddaramanna et al. | |
| 7,865,252 B2 | 1/2011 | Clayton | |
| 7,873,441 B2 | 1/2011 | Synesiou et al. | |
| 7,885,718 B2 | 2/2011 | Yano et al. | |
| 7,886,166 B2 | 2/2011 | Shnekendorf et al. | |
| 7,925,384 B2 * | 4/2011 | Huizenga et al. | 700/277 |
| 7,941,528 B2 | 5/2011 | Hicks, III et al. | |
| 7,954,726 B2 | 6/2011 | Siddaramanna et al. | |
| 8,073,558 B2 | 12/2011 | Koch et al. | |
| 8,091,794 B2 | 1/2012 | Siddaramanna et al. | |
| 8,199,773 B2 * | 6/2012 | Aubin et al. | 370/468 |
| 8,352,094 B2 | 1/2013 | Johnson et al. | |
| 2003/0016237 A1 | 1/2003 | Hickey | |
| 2003/0033230 A1 * | 2/2003 | McCall | 705/36 |
| 2004/0034484 A1 | 2/2004 | Solomita, Jr. et al. | |
| 2004/0137897 A1 * | 7/2004 | Teixeira | 455/423 |
| 2004/0203649 A1 * | 10/2004 | Cashiola | 455/414.1 |
| 2005/0172304 A1 | 8/2005 | Tavares et al. | |
| 2005/0194456 A1 | 9/2005 | Tessier et al. | |
| 2005/0229220 A1 * | 10/2005 | Fisher et al. | 725/89 |
| 2005/0262026 A1 * | 11/2005 | Watkins | 705/67 |
| 2008/0011864 A1 | 1/2008 | Tessier et al. | |
| 2008/0046715 A1 | 2/2008 | Balazs et al. | |
| 2008/0167931 A1 | 7/2008 | Gerstemeier et al. | |
| 2008/0177678 A1 | 7/2008 | Di Martini et al. | |
| 2008/0262848 A1 | 10/2008 | Shienbrood et al. | |
| 2009/0092062 A1 | 4/2009 | Koch et al. | |
| 2009/0187499 A1 | 7/2009 | Mulder et al. | |
| 2009/0198384 A1 | 8/2009 | Ahn | |
| 2009/0204977 A1 | 8/2009 | Tavares et al. | |
| 2009/0295594 A1 * | 12/2009 | Yoon | 340/825.36 |
| 2009/0313083 A1 | 12/2009 | Dillon et al. | |
| 2009/0319090 A1 | 12/2009 | Dillon et al. | |
| 2009/0326726 A1 | 12/2009 | Ippolito et al. | |
| 2010/0088261 A1 | 4/2010 | Montalvo | |
| 2010/0106543 A1 | 4/2010 | Marti | |
| 2010/0114340 A1 | 5/2010 | Huizenga et al. | |
| 2010/0138363 A1 | 6/2010 | Batterberry et al. | |
| 2010/0168924 A1 | 7/2010 | Tessier et al. | |
| 2010/0274377 A1 | 10/2010 | Kaufman et al. | |
| 2011/0016200 A1 | 1/2011 | Koch | |
| 2011/0040550 A1 | 2/2011 | Graber et al. | |
| 2011/0040666 A1 | 2/2011 | Crabtree et al. | |
| 2011/0046805 A1 | 2/2011 | Bedros et al. | |
| 2011/0093493 A1 | 4/2011 | Nair et al. | |
| 2011/0113068 A1 | 5/2011 | Ouyang | |
| 2011/0125542 A1 | 5/2011 | Koch | |
| 2011/0172838 A1 | 7/2011 | Pai et al. | |
| 2011/0196539 A1 | 8/2011 | Nair et al. | |
| 2011/0212700 A1 | 9/2011 | Petite | |
| 2011/0258049 A1 * | 10/2011 | Ramer et al. | 705/14.66 |
| 2012/0066397 A1 | 3/2012 | Koch et al. | |
| 2012/0066686 A1 | 3/2012 | Koch | |
| 2012/0093141 A1 | 4/2012 | Imes et al. | |
| 2012/0136915 A1 | 5/2012 | Koch et al. | |
| 2012/0197456 A1 | 8/2012 | Walter et al. | |
| 2012/0197457 A1 | 8/2012 | Walter et al. | |
| 2012/0197458 A1 | 8/2012 | Walter et al. | |
| 2012/0245968 A1 | 9/2012 | Beaulieu et al. | |
| 2012/0271473 A1 | 10/2012 | Koch | |
| 2012/0277920 A1 | 11/2012 | Koch | |

FOREIGN PATENT DOCUMENTS

| | | |
|---|---|---|
| WO | WO 2009/023230 | 2/2009 |
| WO | WO 2009/085610 | 7/2009 |
| WO | WO 2011/065007 | 6/2011 |

OTHER PUBLICATIONS

U.S. Appl. No. 13/016,181, filed Jan. 28, 2011.
U.S. Appl. No. 13/016,265, filed Jan. 28, 2011.
U.S. Appl. No. 13/016,306, filed Jan. 28, 2011.
U.S. Appl. No. 13/272,086, filed Oct. 12, 2011.
U.S. Appl. No. 13/298,706, filed Nov. 17, 2011.
U.S. Appl. No. 13/299,716, filed Nov. 18, 2011.
Coughlin et al., "Estimating Demand Response Load Impacts: Evaluation of Baseline Load Models for Non-Residential Buildings in California," Lawrence Berkeley National Laboratory, Report No. LBNL-63728, 33 pages, Jan. 2008.
Cruz, "Tutorial on GPU Computing with an Introduction to CUDA," 37 pages, prior to Nov. 17, 2011.
Honeywell, "Automated Demand Response—Southern California Program," 2 pages, printed Aug. 1, 2011.
Honeywell, "The Perfect Response to Peak Events," 4 pages, Nov. 2010.
http://en.wikipedia.org/wiki/Demand_response, "Demand Response," 10 pages, printed Feb. 3, 2012.
https://buildingsolutions.honeywell.com/Cultures/en-US/Markets/Utilities/DemandResponse/, 1page, printed Feb. 3, 2012.
Kiliccote et al., "Findings from Seven Years of Field Performance Data for Automated Demand Response in Commercial Buildings," Lawrence Berkeley National Laboratory, Report No. LBNL-3643E, May 2010.
Kiliccote et al., "Open Automated Demand Response for Small Commercial Buildings," Lawrence: Berkeley National Laboratory, Report No. LBNL-2195E, 104 pages, Jul. 2009.
Kiliccote et al., "Open Automated Demand Response Communications in Demand Response for Wholesale Ancillary Services," Lawrence Berkeley National Laboratory, Report No. LBNL-2945E, 13 pages, Nov. 2009.
Koch et al., "Architecture Concepts and Technical Issues for an Open, Interoperable Automated Demand Response Infrastructure," Berkeley National Laboratory, Report No. LBNL-63664, 7 pages, Oct. 2007.
Koch et al., "Direct Versus Facility Centric Load Control for Automated Demand Response," Lawrence Berkele National Laborator , Report No. LBNL-2905E, 11 pages, Nov. 2009.
Koch et al., "Scenarios for Consuming Standardized Automated Demand Response Signals," Lawrence Berkeley National Laboratory, Report No. LBNL-1362E, 10 pages, Nov. 2008.
Koch, "The Demand Response Automation Server (DRAS)," Building Performance, http://www.akuacom.com/assets/pdf/ASHRAE_2008_Ed_Koch.pdf, 18 pages, prior to Nov. 17, 2011.
Piette et al., "Automated Critical Peak Pricing Field Tests: 2006 Pilot Program Description and Results," Berkele National Laboratory, Report No. LBNL-62218, 67 pages, Aug. 2007.
Piette et al., "Automated Critical Peak Pricing Field Tests: Program Description and Results," Lawrence Berkele National Laboratory, Report No. LBNL-59351, Apr. 2006.

(56) References Cited

OTHER PUBLICATIONS

Piette et al., "Design and Implementation of an Open, Interoperable Automated Demand Response Infrastructure," Berkeley National Laboratory, Report No. LBNL-63665, 6 pages, Oct. 2007.

Piette et al., "Findings From the 2004 Fully Automated Demand Response Tests in Large Facilities," Lawrence Berkeley National Laboratory, Report No. LBNL-58178, 197 pages, Sep. 2005.

Piette et al., "Linking Continuous Energy Management and Open Automated Demand Response," Lawrence Berkeley National Laboratory, Report No. LBNL-1361E, 9 pages, Nov. 2008.

Piette et al., "Open Automated Demand Response Communications Specification," Version 1.0, CEC-500-2009-063, 214 pages, Apr. 2009.

Piette et al., "Participation through Automation: Fully Automated Critical Peak Pricing in Commercial Buildings," Berkeley National Laboratory, Report No. LBNL-60614, 14 pages, Aug. 13-18, 2006.

Watson et al., "Machine to Machine (M2M) Technology in Demand Responsive Commercial Buildings," Berkeley National Laboratory, Report No. LBNL-55087, 18 pages, Aug. 2004.

Yin et al., "Auto-DR and Pre-Cooling of Buildings at Tri-City Corporate Center," Lawrence Berkeley National Laboratory, Report No. LBNL-3348, 140 pages, Nov. 2008.

Holmberg, "Facility Interface to the Smart Grid," National Institute of Standards and Technology, 7 pages, printed 2012.

European Search Report for Related Application No. EP 12169650.4, Dated Nov. 22, 2012.

Abdullah et al., "Demand-Side Energy Management Performed Using Direct Feedback via Mobile Systems: Enables Utilities to Deploy Consumer Based Demand Response Programs," 2010 IEEE International Energy Conference and Exhibition, pp. 172-177, 2010.

U.S. Appl. No. 13/621,195, filed Sep. 15, 2012.

\* cited by examiner

SYSTEM FOR USING ATTRIBUTES TO DEPLOY DEMAND RESPONSE RESOURCES

This application is a continuation-in-part of U.S. patent application Ser. No. 13/019,943, filed Feb. 2, 2011, and entitled "Demand Response Management System", which claims the benefit of U.S. Provisional Patent Application No. 61/301,123, filed Feb. 3, 2010, and entitled "Demand Response Management System". U.S. patent application Ser. No. 13/019,943, filed Feb. 2, 2011, is hereby incorporated by reference. U.S. Provisional Patent Application No. 61/301,123, filed Feb. 3, 2010, is hereby incorporated by reference.

This application is a continuation-in-part of U.S. patent application Ser. No. 12/834,841, filed Jul. 12, 2010, and entitled "A System for Providing Demand Response Services", which claims the benefit of U.S. Provisional Patent Application No. 61/271,084, filed Jul. 17, 2009. U.S. patent application Ser. No. 12/834,841, filed Jul. 12, 2010, is hereby incorporated by reference. U.S. Provisional Patent Application No. 61/271,084, filed Jul. 17, 2009, is hereby incorporated by reference.

BACKGROUND

The present disclosure pertains to utility resources and particularly to assessment and distribution of the resources. More particularly, the disclosure pertains to beneficial management of resources and their loads.

SUMMARY

The disclosure reveals a system for using attributes to deploy demand response resources. A service provider may provide energy to customers. The provider may via interactions modify consumption of the energy by the customers. Customers that participate in these interactions may be regarded as demand response resources. Interactions may incorporate demand response signals sent to the resources at their respective facilities. Each resource may have a demand response client which has an association with a customer account in a demand response management system of the provider. The association may be regarded as a binding of the demand response client. The binding may involve inputting an attribute of the demand response client, which can be correlated to the customer account. The attribute may be, for example, a location of the demand response client. Such attribute may be used for the association of the demand response client with a proper customer account.

DESCRIPTION

Figure 1:
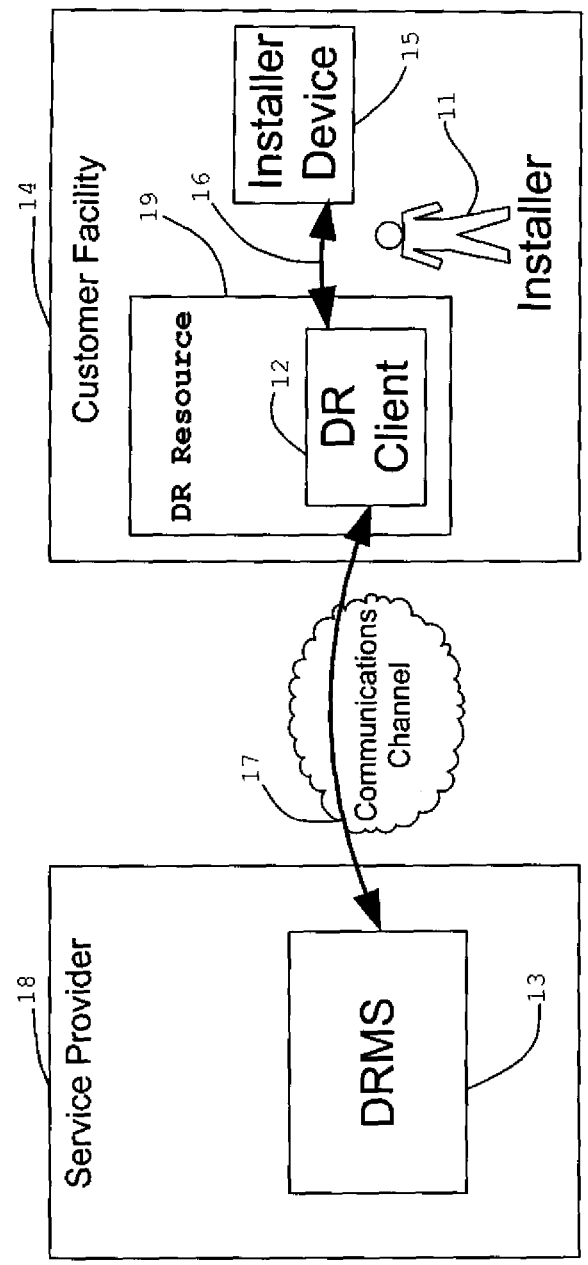
FIG. 1 is a diagram of a demand response system for using attributes of a demand response client for deploying demand response resources.

FIG. 1 is a diagram of a demand response system. Demand response (DR) may refer to interactions between one or more electric service providers 18, such as utilities and independent system operators (ISO's), and their customers at one or more facilities 14 for modifying their customers' electricity consumption (i.e., load profile). Electricity is just one example, among others, of an energy product provided for consumption by customers. The customers that participate in these interactions may be referred to as DR resources 19.

The interactions between a service provider 18 and its DR resources 19 may entail the service provider 18 using a demand response management system (DRMS) 13 to send a message (referred to as a "DR signal") to a DR resource 19 at a customer facility 14. The DR signal may be delivered using a communications channel 17 such as the Internet, paging, and so forth. In order for the DR resource 19 to receive the DR signal, the DR resource 19 should have some sort of equipment (referred to as DR client 12) installed that is capable of communicating with the service provider's DRMS 13 using the communications channel 17.

One of the costly issues in deploying a DR client 12 may be the time and effort involved with associating the DR client 12 with a particular customer account within the service provider's DRMS 13. This association may be referred to as "binding" the DR client 12. Binding the DR client 12 may be important because binding allows the service provider 18 to send DR signals to a DR resource 19 that are specific to that DR resource 19.

Binding may entail inputting some attribute of the DR client 12 into the DRMS 13 that would allow sent DR signals to be routed to the DR client 12. A key is to find a set of one or more attributes which can be easily correlated to a customer account in the DRMS 13 in order to reduce manual data entry and thus save costs for time and effort. The present approach may use, for example, location attributes of DR client 12 to create the binding. The approach, with respect to a binding issue, may allow an easy-to-generate attribute of the DR client 12 (e.g., its location) to be used to associate the DR client 12 with the proper customer account in the DRMS 13.

When a DR client 12 is deployed in the field, it is possible to use a device that determines global positioning system (GPS) coordinates of the DR client 12. These coordinates may then be easily input and stored into the DR client 12 device itself in an automated fashion without a need for a manual data entry. The DR client 12 may then contact the DRMS 13 and send its location information, in addition to other information, to its network communications address. Customer accounts in the DRMS 13 may have attributes, such as an address and so on, that allow their customer locations to be known. Thus, when a DR client 12 contacts the DRMS 13 with its location, it may be automatically correlated to an existing customer account.

It is recognized that there may be some ambiguity between GPS location determined by an installer 11 and a customer's account. Therefore, an alternative to the procedure indicated herein may be to allow an installation technician (installer) 11 resolve those ambiguities by confirming the binding at the customer's site 14. This may be accomplished by presenting alternatives to the installer 11 to choose from or perhaps to allow some sort of browser-based internet application to be used. While the use of these techniques may add an extra burden on the installer 11, they might only be needed in a limited number of cases and may also insure that the correct binding is over a more manual data entry process.

The system as shown in FIG. 1 may incorporate, among other items, the service provider 18, the DRMS 13, the customer facility 14, the demand resource 19, the DR client 12, communications channel 17, some sort of installation or installer device (ID) 15 (used by an installer 11 of the equipment), and a communications technique 16. The following steps may be used to deploy the DR client 12: 1) The installation device 15 may be used by the installer 11 to automatically determine a current location of the DR client 12 using some sort of location-based technology such as a GPS; 2)

Once the location is determined, this location may be input into the DR client 12 using any of a number of low cost communication techniques 16 incorporating a USB connection, Bluetooth, IR, and/or the like; 3) Once the location is entered into the DR client 12, then the DR client 12 may then contact the DRMS 13 via the communication channel 17 and send both its current location and its network address to the DRMS 13; and 4) The DRMS 13 may use the location of the DR client 12 to associate it with a specific customer account.

It may noted that in support of a use case where there are some ambiguities between the location of the installer 11 and the customer's account, the installation device 15 may contain a customer database (DB) that would allow the installer 11 to select a customer account from a limited set of customer accounts to bind to the DR client 12. Thus, the binding may be performed at the customer site 14 as opposed to at the DRMS 13.

Figure 2:
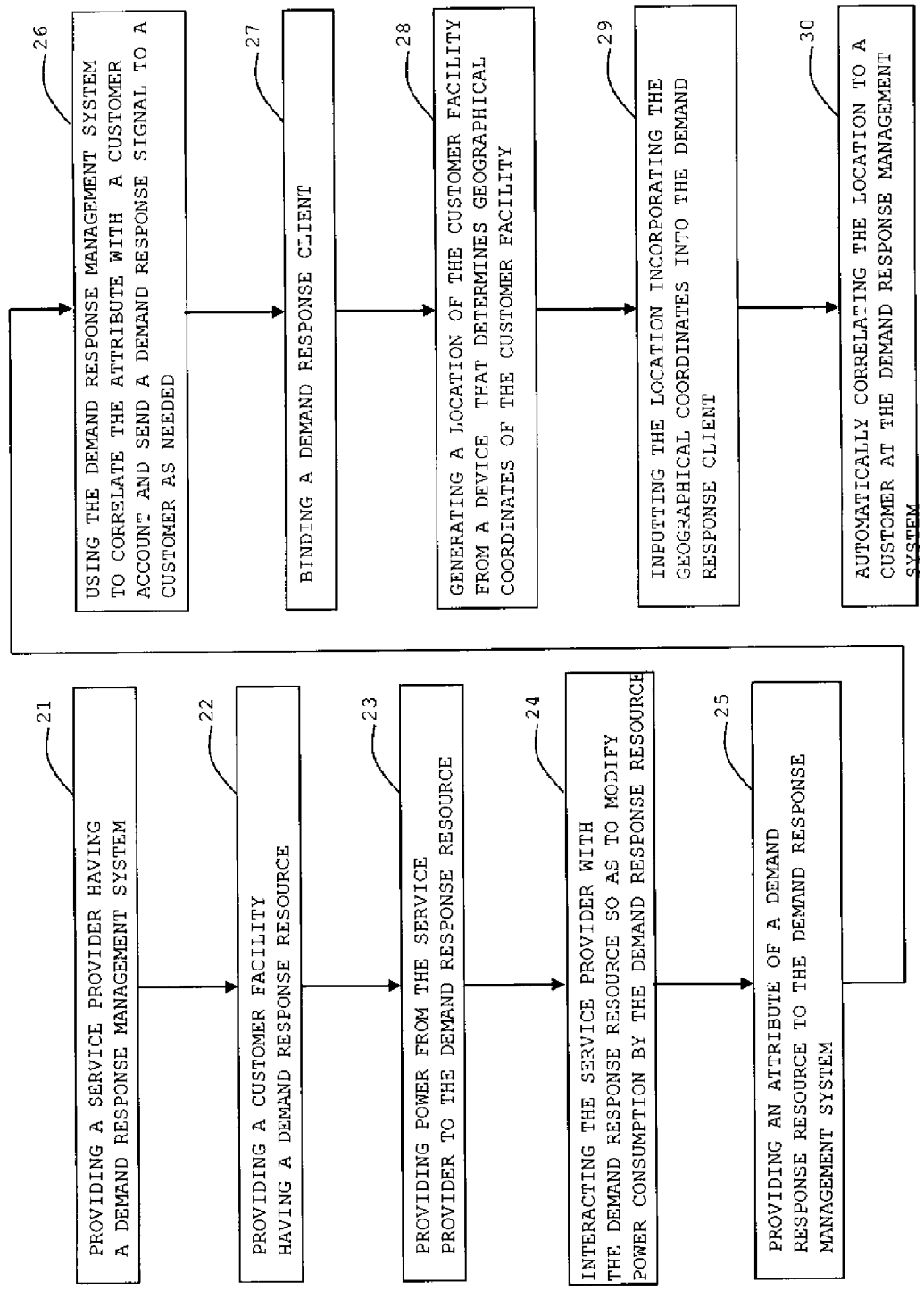
FIG. 2 is a diagram of a demand response resource deployment approach.

FIG. 2 is a flow diagram of a demand response resource deployment approach. The approach may incorporate providing 21 a service provider having a demand response management system, providing 22 a customer facility having a demand response resource, providing 23 power from the service provider to the demand response resource, interacting 24 the service provider with the demand response resource so as to modify power consumption by the demand response resource, providing 25 an attribute of a demand response resource to the demand response management system, and using 26 the demand response management system to correlate the attribute with a customer account and send a demand response signal to a customer as needed.

The approach may also incorporate binding 27 a demand response client. The demand response resource may incorporate the demand response client. The binding 27 the demand response client may permit the service provider to send demand response signals to the demand response resource which are specifically routed to that demand response resource.

The approach may also incorporate generating 28 a location of the customer facility from a device that determines geographical coordinates of the customer facility, and inputting 29 the location incorporating the geographical coordinates into the demand response client. The approach may additionally incorporate automatically correlating 30 the location to a customer at the demand response management system.

An application which is relevant to the present application is U.S. patent application Ser. No. 13/019,943, filed Feb. 2, 2011, and entitled "A Demand Response Management System", which claims the benefit of U.S. Patent Provisional Patent Application No. 61/301,123, filed Feb. 3, 2010, and entitled "Demand Response Management System". U.S. patent application Ser. No. 13/019,943, filed Feb. 2, 2011, is hereby incorporated by reference. U.S. Patent Provisional Patent Application No. 61/301,123, filed Feb. 3, 2010, hereby incorporated by reference.

An application which is relevant to the present application is U.S. patent application Ser. No. 12/834,841, filed Jul. 12, 2010, and entitled "A System for Providing Demand Response Services", which claims the benefit of U.S. Provisional Patent Application No. 61/271,084, filed Jul. 17, 2009. U.S. patent application Ser. No. 12/834,841, filed Jul. 12, 2010, is hereby incorporated by reference. U.S. Provisional Patent Application No. 61/271,084, filed Jul. 17, 2009, is hereby incorporated by reference.

An application which is relevant to the present application is U.S. patent application Ser. No. 12/245,560, filed Oct. 3, 2008, and entitled "Critical Resource Notification System and Interface Device", which claims the benefit of U.S. Provisional Patent Application No. 60/977,909, filed Oct. 5, 2007. U.S. patent application Ser. No. 12/245,560, filed Oct. 3, 2008, is hereby incorporated by reference. U.S. Provisional Patent Application No. 60/977,909, filed Oct. 5, 2007, is hereby incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the prior art to include all such variations and modifications.

What is claimed is:

1. An energy service provider system which via interactions with customers modifies the consumption of energy by the customers comprising:
   an energy service provider comprising a demand response management system;
   a customer facility comprising a demand response resource; and
   a communications channel connected to the service provider and the customer facility; and
   wherein:
   the service provider identifies the customer facility by an attribute provided from the demand response resource to the demand response management system;
   the attribute is associated with information in a customer account;
   a relationship of the attribute with the information creates a binding of the demand response resource with a customer account by the demand response management system;
   the demand response resource comprises a demand response client;
   an association of the demand response client with a customer account is a binding of the demand response client;
   the binding permits a service provider to send demand response signals specifically for the demand response client;
   binding comprises inputting the attribute of the demand response client into the demand response management system to allow demand response signals to be routed to the demand response client; and
   the attribute may be correlated to a customer account.

2. The system of claim 1, wherein:
   an attribute comprises a location of the demand response client and consequently the demand response resource;
   a customer account has an address; and
   the location may be correlated with the address.

3. The system of claim 1, wherein:
   the attribute is associated with information in a customer account; and
   a relationship of the attribute with the information creates a binding of the demand response resource with a customer account by the demand response management system.

4. The system of claim 3, wherein the binding permits the service provider to send demand response signals to the demand response resource which are specific to the demand response resource.

5. The system of claim 4, wherein the demand response management system correlates the location from the demand response resource with information in the customer account to provide an association of the demand response resource with the customer account.

6. The system of claim 1, wherein:
the attribute comprises a location;
the location is of the demand response resource; and
the location is sent from the demand response resource to the demand response management system.

7. The system of claim 1, further comprising:
an installation device situated at the customer facility; and
wherein:
the customer facility comprises a demand response resource;
the attribute comprises a location of the demand response resource; and
the installation device determines the location.

8. The system of claim 7, wherein:
the installation device comprises a customer database; and
a customer account is selected from the customer database to bind the demand response resource at the customer facility.

9. The system of claim 1, further comprising:
an installation device situated at the customer facility; and
wherein the installation device determines a location of the demand response client and consequently the demand response resource.

10. The system of claim 9, wherein:
the installation device comprises a customer database; and
a customer account is selected from the customer database to bind the demand response resource at the customer facility.

* * * * *